Dec. 31, 1935. K. J. TOBIN 2,026,512
SUPPORTING MEANS FOR AUTOMOBILES
Filed Feb. 10, 1932 3 Sheets-Sheet 1
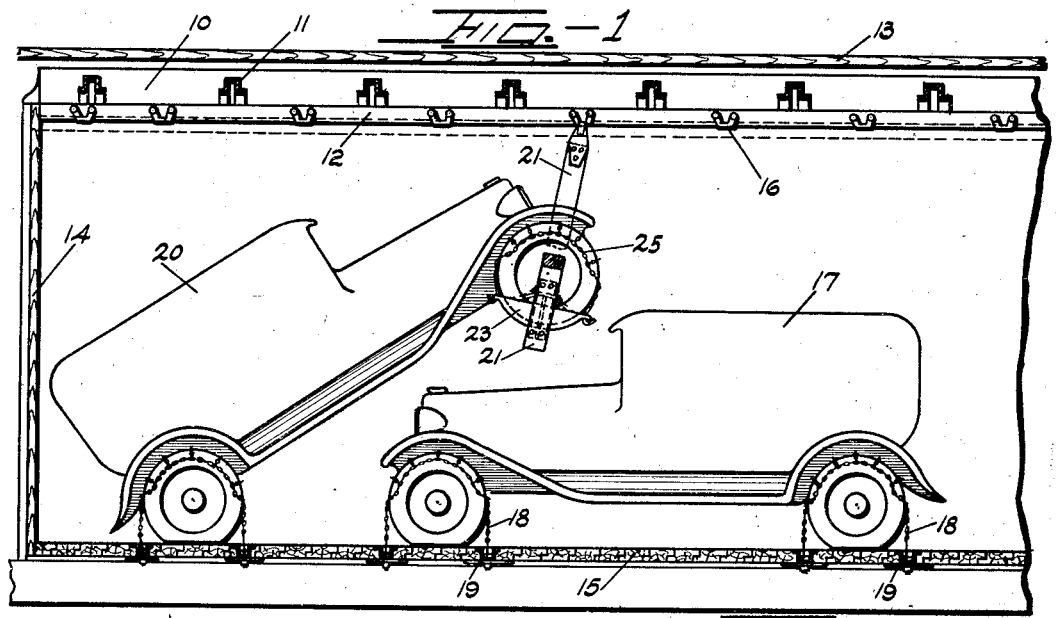
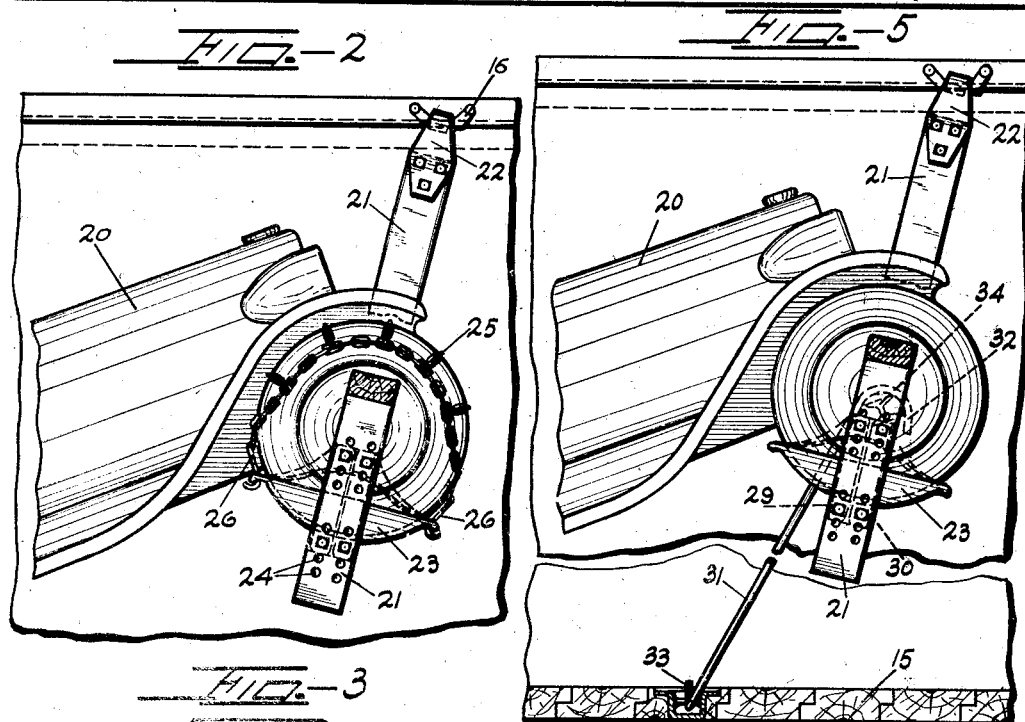
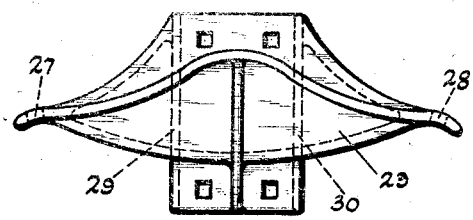
INVENTOR~
KENNETH J. TOBIN
By~ Samuel Reese
ATTY.

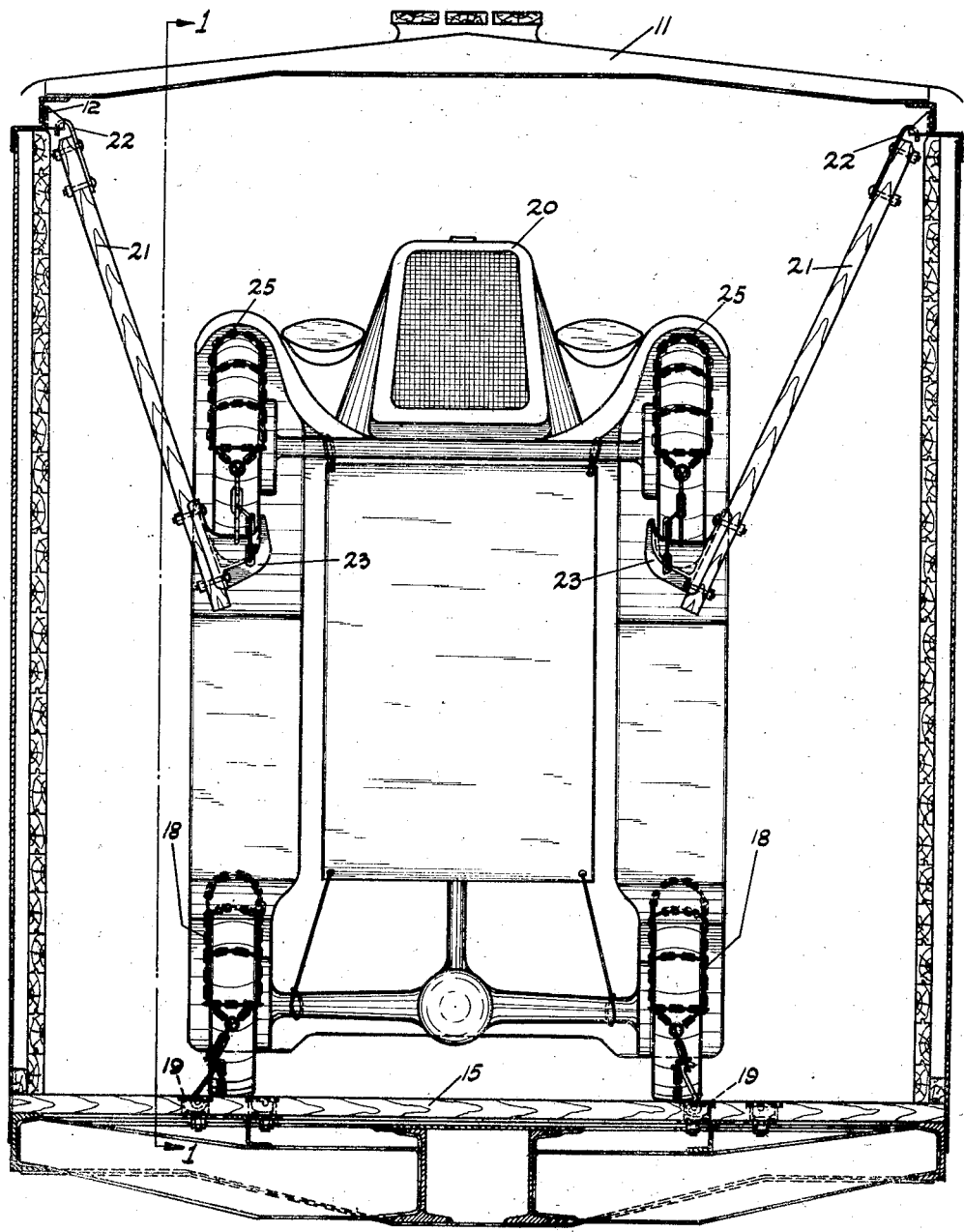

Dec. 31, 1935.  K. J. TOBIN  2,026,512
SUPPORTING MEANS FOR AUTOMOBILES
Filed Feb. 10, 1932   3 Sheets—Sheet 3
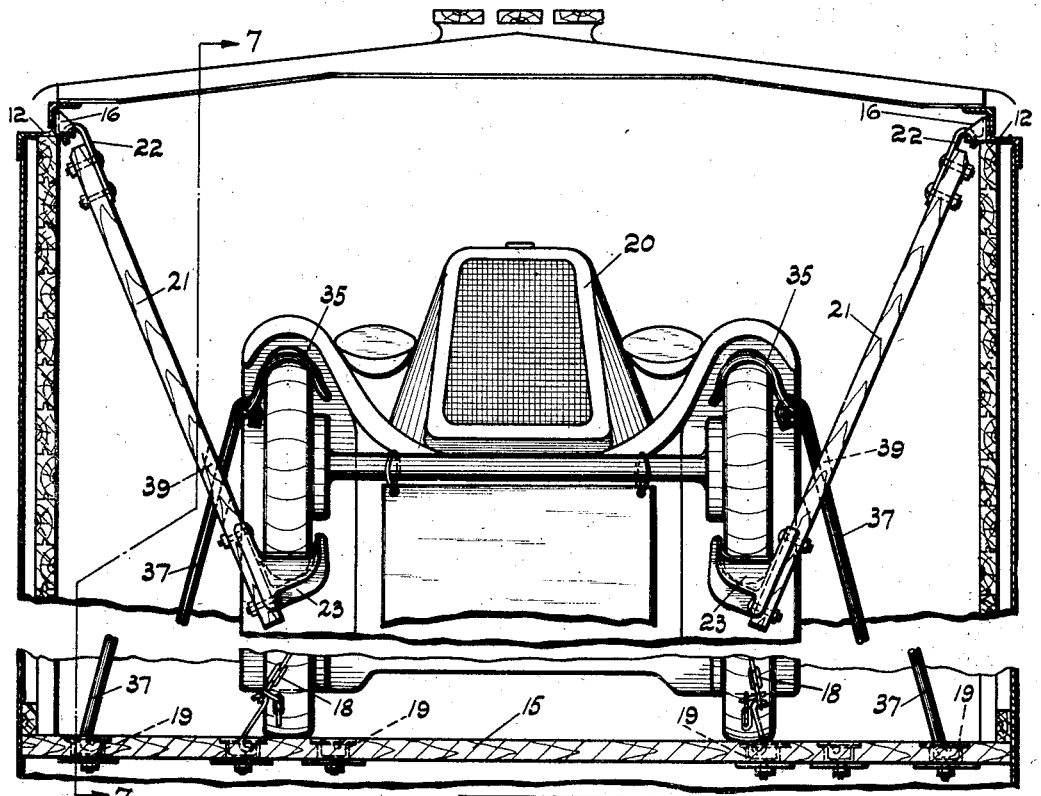
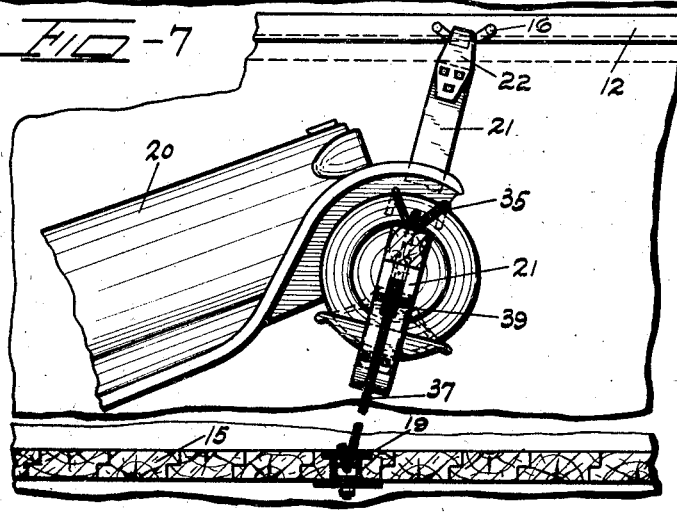
INVENTOR
KENNETH J. TOBIN
By Samuel Reese
ATTY.

Patented Dec. 31, 1935

2,026,512

UNITED STATES PATENT OFFICE 2,026,512

SUPPORTING MEANS FOR AUTOMOBILES

Kenneth J. Tobin, Chicago, Ill., assignor, by mesne assignments, to Evans Products Company, Detroit, Mich., a corporation of Delaware Application February 10, 1932, Serial No. 591,975

10 Claims. (Cl. 105—368)

This invention relates generally to means for sustaining automobiles in inclined or half-decked position for transportation in railway freight cars and it relates more specifically to means for suspending automobiles in said position in freight cars.

It is an object of this invention to provide means for sustaining automobiles in inclined or half-decked position for shipment in railway freight cars which means shall be sturdy in construction, capable of ready application with a minimum of labor, economical and efficient in service and capable of repeated use.

A further object is to provide means for suspending one end of an automobile whereby said automobile may be transported in a freight car in inclined position.

A further object is to provide means depending from a freight car for suspending one end of an automobile in half-decked position in said car.

A further object is to provide means adapted to be hung from a freight car for engagement with the wheels at one end of an automobile to suspend said automobile in inclined position in said car.

A further object is to provide means adapted to be supported by a freight car and having dished members for engagement with the wheels at one end of an automobile to suspend said automobile in inclined position in said car.

A further object is to provide means adapted to be supported in a freight car and having dished members within which the wheels at one end of an automobile may be seated to support said automobile in inclined position in said car.

A further object is to provide means adapted to be supported in a freight car and having dished members within which the wheels at one end of an automobile may be seated to support said automobile in inclined position in said car and devices to maintain said wheels in said dished members.

A further object is to provide means adapted to be supported in a freight car having dished members within which the wheels at one end of an automobile may be seated to support said automobile in inclined position in said car and devices to maintain said wheels in said dished members, the devices being connected to the floor of the car to lend stability to the automobile.

Other objects will become clear as the description of the invention proceeds.

In the drawings,

Figure 1 is a fragmentary longitudinal section through a freight car taken on line 1—1 of Figure 4, showing one mode of arranging automobiles for transportation therein, the inclined or half-decked automobile being suspended by the novel means of this invention.

Figure 2 is an enlarged fragmentary view showing the application to an automobile of means for suspending one end of the automobile for shipment and devices securing said automobile to said means.

Figure 3 is an elevational detail of a dish shaped member employed in the suspending means of the invention.

Figure 4 is a transverse section through a freight car looking toward an inclined automobile from the front end thereof.

Figure 5 is a view similar to Figure 2 showing a modified device for securing an automobile to the suspending means therefor.

Figure 6 is a partial view similar to Figure 4 showing a further modification of the invention.

Figure 7 is a section taken on line 7—7 of Figure 6.

Referring to the drawings and the embodiment of the invention illustrated in Figures 1 to 4, inclusive, the numeral 10 designates generally a railway house car embodying carlines 11, side plates 12, running board 13, end 14, and floor 15. A plurality of stirrups 16 are secured to the side plates of the car for a purpose which will hereinafter appear.

As partially illustrated in Figure 1 of the drawings automobiles of certain limited length of wheel base may be positioned in a freight car in such a manner that four of such automobiles may be accommodated therein. In such positioning two of the automobiles are shipped flat or, in other words, with their wheels in contact with the floor, while the remaining two automobiles must be positioned with the wheels at one end thereof resting upon the floor and the wheels at the other end thereof supported above the floor. This position of the latter automobile is known as the inclined or half-decked position. Figure 1 of the drawings illustrates two automobiles only in their position within a freight car. It is to be understood, however, that two additional automobiles are accommodated within the car in the same relative position as is indicated for the two automobiles illustrated. The automobile 17, which is shipped flat, is supported within the freight car by means of a plurality of chains embracing the wheels of said automobile, the ends of said chains being attached to anchoring devices provided in the floor 15 of the freight car. It may be mentioned briefly that when the automobile 17 has been properly positioned in the freight car the air in said wheels is released sufficiently to permit engagement of the securing chains 18 therewith and the attachment of the ends of said chains, which are provided with hooks, with the anchoring devices 19. Thereupon air is again admitted into said wheels to establish a taut engagement between the wheels and the floor of the car. By the word "wheels" it is intended to include the tires employed with automobile wheels. It is to be observed that the wheels of the automobile 17, which is shown in its anchored position in the freight car, as illustrated exaggerate the condition of the wheel at the point of engagement with the floor. The portion of each wheel resting upon the floor is shown flat for a considerable extent in order to more clearly indicate the fact that, in view of the method used in applying the anchoring chains to the automobile, considerable variation in size of wheel will not affect the utility of such anchoring chains.

As heretofore indicated, it is necessary to position two of the automobiles in the freight car in inclined or half-decked position in order to provide the necessary space to position two other automobiles flat within said car. The rear wheels of the half-decked automobile 20 are fastened to the floor of the freight car in the same manner and by the same means employed in the securement of the automobile 17 to the floor. The opposite end or front end of the automobile must be positioned so that it lies above the floor of the car and to maintain said end in its position above said floor the suspending means of the instant invention is provided.

This suspending means embodies a bar 21 which may be of wood as illustrated or, if desired, may be made of metal. Secured to the upper end of said bar in any desired manner is a hook-shaped member 22 adapted to have hooked engagement with a stirrup 16 in the operative position of the suspending means. The lower end of the bar 21 carries a dish-shaped member 23 which may be secured to said bar in any desired manner. The dish-shaped member 23 is illustrated as being attached to the bar by means of a plurality of bolts, said bar preferably being provided with a plurality of spaced openings 24 whereby adjustability of said member relative to the bar is obtained. It will be clear from a consideration of Figure 4 of the drawings that suspending means of the character described is utilized with each of the front wheels of the half-decked automobile and that in its operative relationship with respect to said wheels the latter are positioned within the dish-shaped member of the suspending means.

It is desired, in order to avoid disengagement between said wheels and supporting means, that provision be made to securely retain said wheels within the dish-shaped member 23 of the supporting means. To this end there is illustrated in Figures 2 and 4 of the drawings a chain 25 which embraces the wheel and which is secured at its ends to the dish-shaped member by means of hooks 26 provided in said chain having hooked engagement with the opposite ends of the dished member 23. To permit of such engagement the ends of the dish-shaped member are provided with openings 27 and 28. Additionally, said dish-shaped member is provided with a plurality of spaced flanges 29 and 30, between which the bar 21 is adapted to be positioned for preventing lateral play between said member and said bar. It may be noted that the principle of application of the chains 18 to the wheels of the automobile 17 may be utilized in the application of the chains 25 to the forward wheels of the automobile 20. In other words, said wheels may be deflated when positioned within the dished members 23 to permit proper engagement of the chains 25 with said wheels and with the dished members, whereupon inflation of said tires will establish substantially fixed relationship between the wheels and the dished members.

In the modification of the invention illustrated in Figure 5 of the drawings a substitute form of device for securing the forward wheels of the half-decked automobile 20 within the dished member 23 is illustrated. In lieu of the chains 25 there is employed a plurality of bars 31 provided with hooked ends 32 and 33. The hooked end 32 is adapted to be engaged with the front axle 34 of the automobile while the hooked end 33 is adapted to be engaged with an anchoring device 19 formed in the floor of the freight car. The automobile is positioned with the front wheels thereof seated within the dish-shaped members 23. Said wheels are then deflated so that engagement between the hooked ends 32 and 33 of the bars 31 with the axle and the anchoring devices, respectively, may be readily effected. After such engagement the wheels are again inflated and the bars 31 are placed under tension. The use of the bars not only fixedly maintains the wheels within the dish-shaped members but functions additionally to prevent upward movement of said wheels. In the embodiment of the invention illustrated in Figures 1 to 4, inclusive, it will be apparent that upward movement of the forward wheels of the automobile 20 will be resisted by the engagement between the bar 21 of the suspending means and the stirrups 16. In the embodiment illustrated in Figure 5 of the drawings it is apparent that tendency of upward movement of the suspending means will be resisted by the bars 31.

A further modification of the invention is illustrated in Figures 6 and 7 of the drawings. In this modification the automobile 20 is positioned as indicated in Figure 1 of the drawings, the front end thereof being suspended from the freight car by means of the bars 21, the hooked portions 22 of which are engaged with stirrups 16 and which carry the dished members 23 adapted to receive the wheels of the automobile at the front end thereof. These wheels are retained in the members 23 by means of the hooked members 35 which engage said wheels and from which rods 37 extend into hooked engagement with anchoring devices 19 secured in the floor of the car. It will be apparent that as in the foregoing embodiment of the invention the wheels at the front end of the automobile will be maintained in substantially fixed position in the members 23 by means of the hooked members 35 and the rods 37 when said members and said rods are engaged, respectively, with the wheels and anchoring devices in the deflated condition of the wheels upon subsequent inflation of said wheels. It may be noted that where a single rod is employed with each of the hooked members 35, said rods are adapted to pass through openings 39 provided in the bars 21. Also, as in the former constructions the rear wheels of the automobile 20 are adapted to be secured to the floor of the freight car by means of chains 18 embracing said wheels and having engagement with anchoring devices 19.

The suspending means of the invention has been described in its particular application to automobiles shipped in inclined or half-decked position in freight cars inasmuch as automobiles other than those which are shipped flat are customarily so positioned. It is to be understood, however, that the invention is not limited in its application to half-decked automobiles but may as readily be utilized to completely suspend an automobile. In other words, the suspending means may be applied to the rear wheels as well as to the front wheels of an automobile to position it within a freight car.

While in the foregoing description the mode of securing the wheels at the suspended end of the automobile to the dished member 23 has utilized the deflation and inflation of the wheels, it is to be understood that the invention is not limited to such mode of obtaining substantial fixity between the wheels and the dished members. It will be apparent that if desired turn-buckles may be utilized in each of the described devices, said turn-buckles providing requisite adjustability to obtain substantially fixed engagement between the wheels and the dished members.

Numerous modifications and changes in the details of the embodiments of the invention disclosed will be readily apparent to those skilled in the art. It is intended, consequently, that all such changes and modifications be comprehended within the invention, which is to be limited only by the scope of the claims appended hereto.

I claim:

1. In a railway freight car, an automobile therein for shipment in inclined position, means secured to said car above said automobile and depending from said car for suspending one end of said automobile, said means comprising dished members adapted to receive the wheels of the suspended end of the automobile, and devices for retaining said wheels in substantially fixed position in said dished members, each of said devices comprising means carried by a dished member and engaging one of said wheels.

2. In a railway freight car, an automobile therein for shipment in inclined position, means secured to said car above said automobile and depending from said car for suspending one end of said automobile, said means comprising dished members adapted to receive the wheels of the suspended end of the automobile, and devices for retaining said wheels in substantially fixed position in said dished members, each of said devices comprising flexible means carried by a dished member and embracing one of said wheels.

3. In a railway freight car, an automobile therein for shipment in inclined position, means depending from said car for suspending one end of said automobile, said means comprising dished members adapted to receive the wheels of the suspended end of the automobile, and a chain embracing each of said wheels with its ends in hooked engagement with a dished member for maintaining said wheels in substantially immovable relationship in said dished members.

4. A hanger for automobiles comprising a substantially rigid angular bar, attaching means secured to one end thereof for movably suspending said hanger and a dished metallic wheel receiving member secured to the opposite end thereof, said member comprising spaced flanges engaging the opposite sides of said bar.

5. In a railway freight car, an automobile, means depending from said car for suspending one end of said automobile, said means comprising members adapted to receive the wheels of the suspended end of the automobile, and devices for retaining said wheels in substantially fixed position in said members, said devices comprising members having hooked engagement with said wheels and means fastened to said members and to the floor of the car, said last mentioned means extending through openings provided in said suspending means.

6. In a railway freight car, the combination with an automobile therein for shipment in an inclined position, of a plurality of devices for movably suspending one end of said automobile from said car, each of said devices engaging an adjacent wheel provided on the suspended end of said automobile and comprising a substantially rigid bar swingably secured at its upper end to said car to permit slight movement of said devices with said automobile and a trough shaped metallic wheel receiving member carried by said bar, said wheels having peripheral seating engagement in said members.

7. In a railway freight car, the combination with an automobile therein for shipment in an inclined position, of a plurality of devices for movably suspending one end of said automobile from said car, each of said devices engaging an adjacent wheel provided on the suspended end of said automobile and comprising a substantially rigid bar swingably secured at its upper end to said car to permit slight movement of said devices with said automobile and a trough shaped metallic wheel receiving member carried by said bar, said wheels having peripheral seating engagement in said members and means peripherally engaging and retaining said wheels in substantially fixed position in said members.

8. A hanger for automobiles comprising a substantially rigid elongated member, means for movably suspending said member provided on the upper end of said member and a trough shaped metallic wheel receiving member carried by and extending laterally from the lower end of said first mentioned member.

9. In a railway freight car, the combination with an automobile therein for shipment in an inclined position, of a plurality of devices for suspending one end of said automobile from said car, each of said devices engaging an adjacent wheel provided on the suspended end of said automobile and comprising a substantially rigid bar swingably secured at its upper end to said car and a trough shaped metallic wheel receiving member carried by said bar, said wheels having peripheral seating engagement in said members and devices for retaining said wheels in substantially fixed position in said members, said devices gripping a portion of said wheels and being secured to the floor of said car.

10. In a railway freight car, the combination with an automobile therein for shipment in an inclined position, of a plurality of devices for suspending one end of said automobile from said car, each of said devices engaging an adjacent wheel provided on the suspended end of said automobile and comprising a substantially rigid bar swingably secured at its upper end to said car and a trough shaped metallic wheel receiving member carried by said bar, said wheels having peripheral seating engagement in said members and devices for retaining said wheels, in said members, each of said devices comprising a hook portion disposed in peripheral engagement with said wheels, said devices being fastened to the floor of said car.

KENNETH J. TOBIN.